United States Patent [19]

Gineys

[11] Patent Number: 5,581,606

[45] Date of Patent: Dec. 3, 1996

[54] DAT STORAGE BACK-UP AND MODEM APPARATUS

[76] Inventor: Gregory A. Gineys, 16 Le Haras Au Bois, Chantilly, France

[21] Appl. No.: 959,225

[22] Filed: Oct. 9, 1992

[51] Int. Cl.$^6$ .................................................... H04M 1/64
[52] U.S. Cl. ................... 379/88; 379/96; 360/48
[58] Field of Search ........................... 379/67, 76, 88, 379/89, 100, 74, 77, 68, 83, 98, 96; 395/200, 575; 360/48, 32, 46, 92

[56] References Cited

U.S. PATENT DOCUMENTS

| | | | |
|---|---|---|---|
| 4,540,856 | 9/1985 | Fujii | 379/76 |
| 4,581,484 | 4/1986 | Bendig | 379/76 |
| 4,897,865 | 1/1990 | Canuel | 379/88 |
| 4,899,232 | 2/1990 | Odaka et al. | 360/48 |
| 5,091,805 | 2/1992 | Odaka et al. | 360/48 |
| 5,133,004 | 7/1992 | Heileman | 379/67 |
| 5,155,636 | 10/1992 | Odaka | 360/32 |
| 5,193,110 | 3/1993 | Jones | 379/89 |
| 5,194,995 | 3/1993 | Severtson | 360/48 |
| 5,196,943 | 3/1993 | Hersee | 379/88 |
| 5,212,772 | 5/1993 | Masters | 395/200 |
| 5,212,784 | 5/1993 | Sparks | 395/575 |
| 5,220,596 | 6/1993 | Patel | 379/89 |

Primary Examiner—Krista M. Zele
Assistant Examiner—Fan Tsang
Attorney, Agent, or Firm—Blakely, Sokoloff, Taylor & Zafman

[57] ABSTRACT

A streamer apparatus for transferring data between a first storage device of a computer system, which has serial interface transmit and receive ports for transmitting and receiving data and a digital audio storage device, which has audio input and output lines. The streamer apparatus comprises a data path for transferring first data from the serial interface transmit port to the audio input line of the digital audio storage device, which is set to record at a predetermined level. An amplifier is coupled to the audio output line of the digital audio storage device for receiving and amplifying second data from the digital audio storage device by a predetermined factor. A level converter is coupled to the amplifier and the serial interface receive port for level-converting the second data to be compatible as input to the serial interface receive port of the first storage device. The level converter transfers the level-converted second data to the first storage device through the serial interface receive port. The streamer apparatus also comprises a modem circuit coupled to the data path for receiving first data from the serial interface transmit port and transferring the data to a remote computer system in a modem mode. Data from the remote computer system can be received by the modem circuit and level-converted by a level converter for reception by the serial interface receive port of the first storage device.

14 Claims, 5 Drawing Sheets

DAT STORAGE BACK-UP AND MODEM APPARATUS

BACKGROUND OF THE INVENTION

1. Field of the Invention

The present invention relates to data back-up storage systems for computer systems, and more specifically to streamer devices for transferring data between a computer system and a back-up storage device.

2. Art Background

It has become quite common to perform tape back-up for a computer system. In the early days of computing, mainframe vendors developed half-inch reel-to-reel tape drives, which remain popular in centralized computing environments today. Recently, with the proliferation of personal computer systems came quarter-inch tape drives. Quarter-inch cartridge (QIC) tapes with 5 MBytes of data capacity soon became a popular back-up solution for the stand-alone personal computers. Next came the 8-mm tape format, which uses the standard VHS recording method, helical scan. The primary benefit to early users of 8-mm tape was its ability to store over 2 gigabytes of data on a VHS cassette. Like its quarter-inch and half-inch predecessors, the 8-mm tape employs analog recording methods.

Now comes digital audio tape (DAT) which uses digital recording technology developed originally for DAT devices in the music industry. In 1988, the first DAT drive for storing computer data was introduced. DAT shares with 8-mm tape the ability to store gigabytes of data on a small tape cartridge. Although the two technologies are able to store comparable quantities of data, DAT drives are cheaper to manufacture, which is one of the reasons for DAT's surging popularity in providing multi-gigabyte back-up solutions.

Presently, there are two popular methods for performing memory back-up for the hard disk contents of personal computer systems. The first method is to store the hard disk data of a personal computer system on an optical disk. The data on the optical disk is read by a laser beam. The capacity of a 3½" optical disk is typically 128 MBytes of data and for a 5¼" optical disk is typically 650 MBytes of data.

The second method is to store the hard disk data on a magnetic tape, such as the ones described above. Several types of tape streamers presently exist in industry. Some use 8-mm digital data storage (DDS) cartridges with maximum capacity of about 2.3 gigabytes; others use 4-mm DDS cartridges with maximum capacity of about 1.3 gigabytes; and others use basic QIC with maximum capacity of 1.3 gigabytes, but more commonly a capacity of around 40–250 MBytes.

There are disadvantages associated with the prior methods. First, the tape in a tape drive must be formatted before use, which becomes a time consuming process as more tapes are used for back-up. Also, the standard QIC may be exposed to fingerprints or dust, since the tape in the cartridge is not protected. This can result in distorted data storage. All existing streamers also require an interface card to be installed in order to function with an intended computer such as an IBM-compatible computer, or an Apple Macintosh computer, which dedicates the streamers to either an IBM-compatible or a Macintosh computer, but not both.

Furthermore, as data back-up storage and retrieval are frequently conducted while the users are away from their desk environments, e.g. traveling executives, streamers' portability and universal compatibility become important issues. A user should be able to download the contents of a hard disk to a readily available storage device anywhere in the world. Additionally, a user sometimes needs to communicate with a remote computer system through a modem, which becomes an additional item to carry on the trip. Therefore, it is desirable to have both the streamer and the modem on a unit, which is also capable of operating in a variety of voltage of, for example, 110 volts and 220 volts. Also, it is desirable to have the modem capable of operating either international or US communication standards.

SUMMARY OF THE INVENTION

Therefore, it is an object of the present invention to provide a compact, lightweight, and portable streamer.

It is also an object of the present invention to provide a streamer with modem capability with universal compatibility, i.e., North American Bell and CCITT recommendations.

It is yet another object of the present invention to provide a streamer with modem capability, which can be interchangeably used with various kinds of personal computers.

It is another object of the present invention to provide a streamer which does not require the storage tape to be pre-formatted for back-up.

It is another object of the present invention to provide a streamer/modem unit which can be operated through a single communication software in its connecting personal computer.

A streamer apparatus for transferring data between a first storage device of a computer system, which has serial interface transmit and receive ports for transmitting and receiving data and a digital audio storage device, which has audio input and output lines. The streamer apparatus comprises a data path for transferring first data from the serial interface transmit port to the audio input line of the digital audio storage device, which is set to record at a predetermined level. An amplifier is coupled to the audio output line of the digital audio storage device for receiving and amplifying second data from the digital audio storage device by a predetermined factor. A level converter is coupled to the amplifier and the serial interface receive port for level-converting the second data to be compatible as input to the serial interface receive port of the first storage device. The level converter transfers the level-converted second data to the first storage device through the serial interface receive port. The streamer apparatus also comprises a modem circuit coupled to the data path for receiving first data from the serial interface transmit port and transferring the data to a remote computer system in a modem mode. Data from the remote computer system can be received by the modem circuit and level-converted by a level converter for reception by the serial interface receive port of the first storage device.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

A streamer apparatus for backing-up the contents of a personal computer hard disk to an external digital audio tape (DAT) is disclosed. As will be appreciated by those skilled in the arts, the streamer apparatus of the present invention is easy to use, readily portable, compatible with both IBM-type and Apple Macintosh personal computer systems, capable of modem transmission, functional anywhere in the world regardless of the local electrical voltage or telephone standards, and most importantly, capable of high-capacity data storage at a low per-MByte cost. Furthermore, the streamer apparatus does not need any special interface card for connection between the external port of the personal computer and the streamer apparatus.

In the following description, numerous specific details, such as various passive and discrete components, are set forth in order to provide a thorough understanding of the present invention. It will be obvious, however, to one skilled in the art that these details are not required to practice the present invention. In other instances, well know circuits, methods and the like are not set forth in detail in order to avoid unnecessarily obscuring the present invention.

Figure 1:
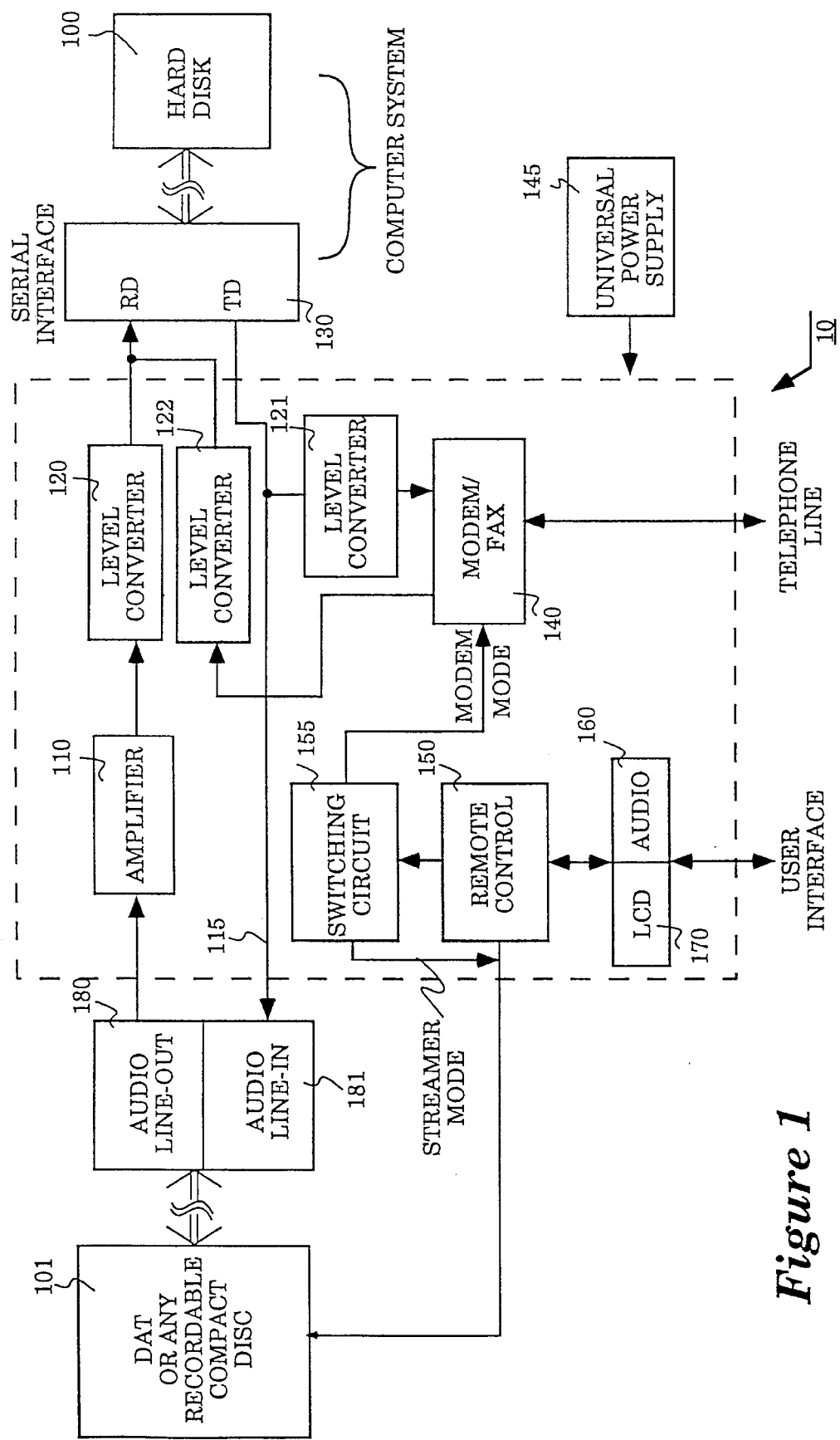
FIG. 1 is a functional block diagram for the streamer apparatus of the present invention.

Reference is now made to FIG. 1, where a functional block diagram of streamer apparatus 10 of the present invention is illustrated. As shown in FIG. 1, serial interface 130 and hard disk 100 are typically found on a personal computer system, such as an IBM-PC compatible, an Apple Macintosh computer or the equivalents thereof. DAT player/recorder 101 and audio line-in port 181 and line-out port 180 are found in a typical "off-the-shelf" digital DAT player/recorder available for digital audio recording. It should also noted that other digital audio players/recorders, such as the new recordable compact discs, with long play mode, multi-track recording and compression through V-42 bis compression can also benefit from the teaching of the present invention. Streamer apparatus 10 of the present invention comprises an amplifier 110 coupled to audio line-out port 180 of DAT player/recorder 101. Coupled to receive the output of amplifier 110 is level converter 120. The output from level converter 120 is coupled to the receive data pin (RD) of serial interface 130 of the computer system. Data path 115 connects between the transmit data pin (TD) of serial interface 130 and audio line-in port 181 of DAT player/recorder 101. Remote control 150 is connected to DAT player/recorder 101 for on-board controlling of the operation of DAT player/recorder 101. LCD (liquid crystal display) display unit 170 and audio interface 160 are also coupled to remote control 150 to provide additional features of user interface, such as voice and visual status signals. Modem 140 is connected to the RD pin of serial interface 130 through level converter 122. Modem 140 is also connected to receive data from the TD pin of serial interface 130 through level converter 121 for transmission of data between the computer system and a remote computer system. Switching circuit 155 is coupled to remote control 150 for selecting between the modem and the streamer mode as will be described in further detail.

The operation of streamer apparatus 10 will now described with reference to FIG. 1. In a streamer mode, data in hard disk 100 is transmitted and received through serial interface ports 130 in both streamer and modem mode. In the case of an IBM-PC compatible computer, data transfer is through an RS-232C port, and in the case of an Apple Macintosh computer through an RS-422 port. As will be appreciated by those skilled in the arts, transmission and reception through serial interface port 130 can be easily accomplished when the computer is driven by a standard communication software. To initiate a file transfer, the user selects the speed of the serial port, currently up to 38,400 bits per second (bps) and then selects the file to be transmitted through the serial port.

Before data is transmitted through the TD pin of serial interface port 130, streamer apparatus 10 and DAT player/recorder 101 are set in a RECORD mode, where data from the TD pin of serial interface port 130 is directly recorded through audio line-in port 181 of DAT player/recorder 101. Currently, the audio recording level of DAT player/recorder 101 is set at −1 dB for intelligible reception. However, it should be obvious to those skilled in the arts that other recording levels can be set to accommodate other recording conditions and data transmissions.

To retrieve data stored on DAT player/recorder 101, the computer system is set to receive data through its RD pin of serial interface port 130. DAT player/recorder 101 is then placed in a PLAY mode for data to transfer from audio line-out port 180 of DAT player/recorder 101 through amplifier 110 and level converter 120 to the RD pin of serial interface port 130 of the computer system. Currently the amplification ratio of amplifier 110 is adjustable through variable resistance values to accommodate a serial port speed of 38,400 bps and recording level of −1 dB. However, it should be apparent to those skilled in the art that a different amplification ratio is needed as the speed of the serial port is varied. After data is amplified by amplifier 110, level converter 120 converts data levels to the appropriate levels for reception by the RD pin of serial interface port 130. Level converter 120 is currently implemented in a Motorola MC1488 level converter chip.

In a modem mode, modem 140 of streamer apparatus 10 of the present invention controls the data transfer process. Data can be received from a telephone line through modem 140 and transferred to the RD pin of serial interface port 130 of the computer system after level conversion by level converter 122, which is currently implemented in a Motorola MC1488 level converter chip. Transferring data to a remote computer system through modem 140 is accomplished through the TD pin of serial interface port 130, data path 115 and level converter 121 to modem 140. Level converter 121 is currently implemented in a Motorola MC1489 level converter as will be understood by those skilled in the art. Also, it should be apparent to those skilled in the art that modem 140 can easily be a modem chip with facsimile capability, or a single facsimile circuit for remote data communication, as they are now readily available in industry.

Figure 4:
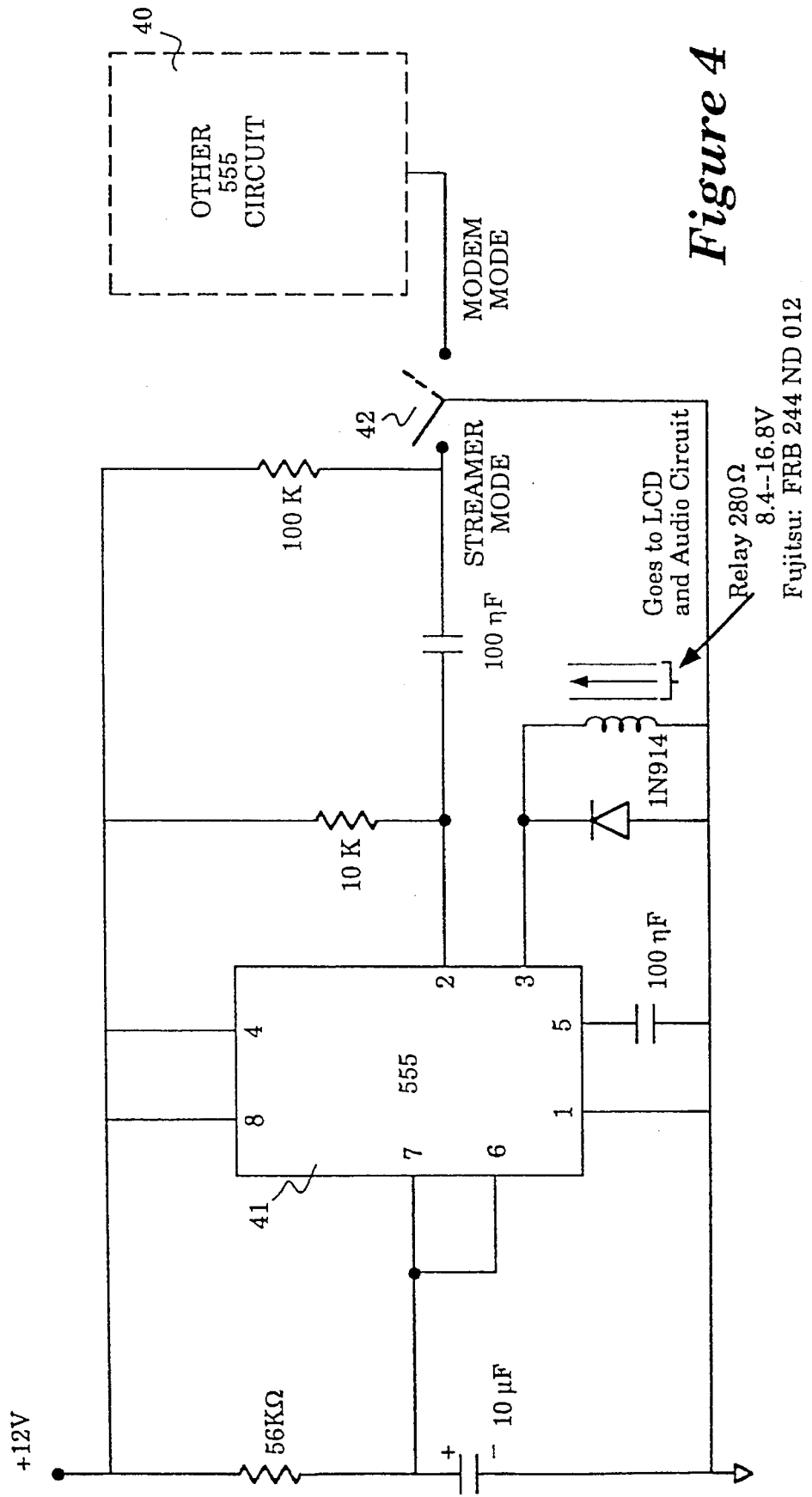
FIG. 4 illustrates a timer/delay circuit for switching between the modem and streamer modes of the streamer apparatus of the present invention.

Selection between modem and streamer modes is facilitated by switching circuit 155 to be further illustrated in FIG. 4. Referring to FIG. 4, a 555 timer chip 41 is implemented with a 56 KΩ resistor and a 10 μF capacitor to maintain a 1 second delay upon switching. It should be apparent to those skilled in the art that 555 timer chip 40 is implemented in the same way as 555 timer chip 41 to also maintain the 1 second delay upon switching. The right 555 circuit 40 switches its relay for 1 second when switch 42 is switched on the right side, i.e. to modem mode. The left 555 circuit 41 switches its relay for 1 second when switch 42 is switched to the left, i.e., to streamer mode. Outputs of the relays are connected to LCD and sound circuits only, for them to inform the user of the mode of streamer apparatus 10. Switch 42 is conveniently implemented as one-half of a double-pole, double-throw (DPDT) switch, the other half being used to connect the ground power supply pin of the streamer or modem, whichever is selected, to the GROUND in order for one of the circuits to function.

Figure 5:
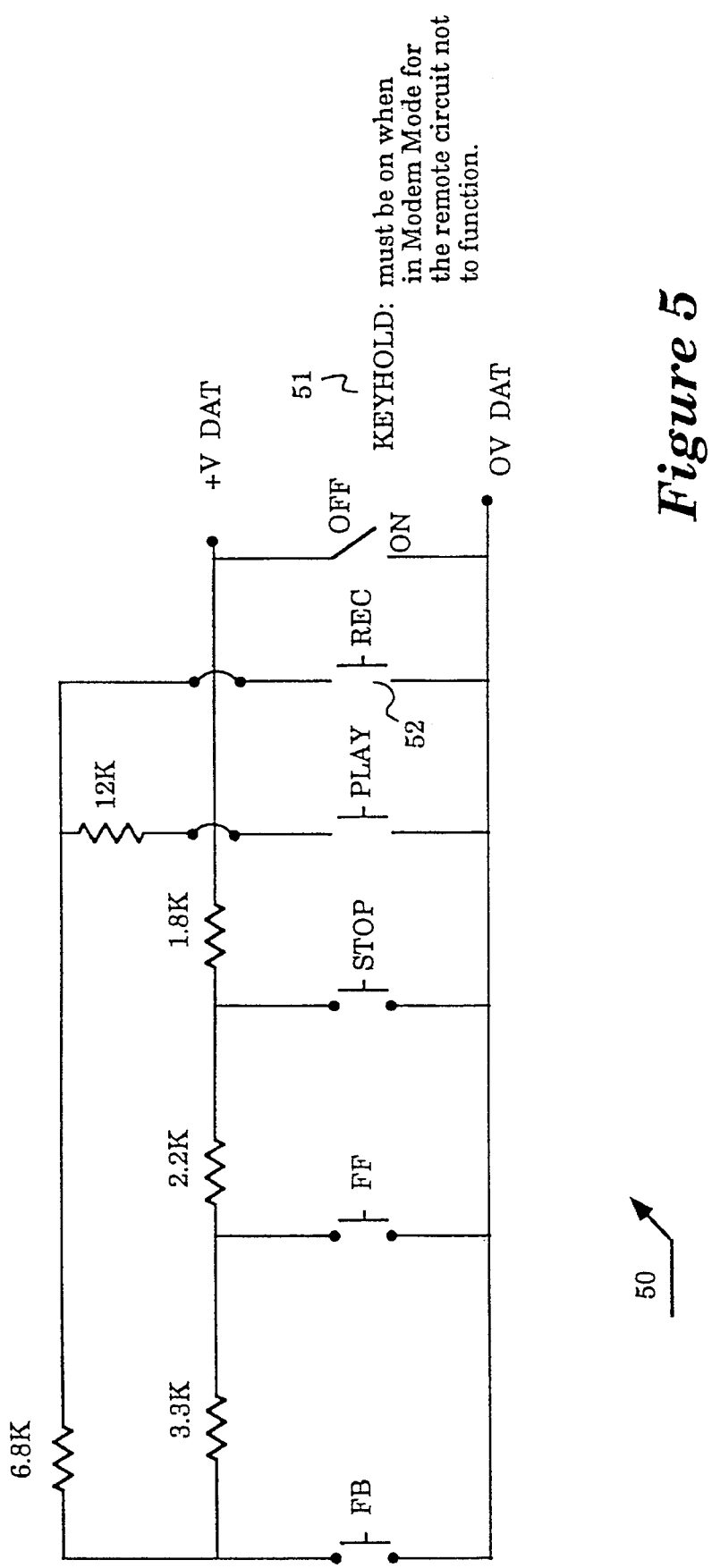
FIG. 5 illustrates a circuit diagram for the remote control unit of the streamer apparatus of the present invention.

As will be appreciated by those skilled in the art, remote control 150 of streamer apparatus 10 of the present invention can be pre-programmed to remotely control any DAT player/recorder capable of accepting remote control signals such that a user only needs to interact with the control switches of streamer apparatus 10. Referring to FIG. 1, remote control 150 is currently implemented in circuit 50 shown in FIG. 5 with a one-touch RECORD feature. Note that after ON/OFF switch 51 is turned OFF, recording can be accomplished by pressing the single REC switch 52. The keyhold option inhibits operation of the DAT remote when the machine is in modem mode. Furthermore, a back-lit LCD module, currently implemented in a "Gestionnaire LCD Programmable" circuit from Lextronic in which a Sanyo Dot Matrix Module LCM-567-31 with an ELP04 transformer, available from Sanyo Electric Company of Japan, is used to provide full alphanumeric visual display capability. The Sanyo LCD part is also capable of writing any arbitrary fonts to its built-in character generator random-access memory (RAM), thus allowing characters in various languages to be displayed.

An audio circuit 160 coupled to remote control 150 can also be implemented to provide pre-programmed vocal responses as additional features of user interface. Currently audio circuit 160 is a "Dicta-Vox" circuit manufactured by Lextronic. Vocal messages for replay through audio circuit 160 are recorded on an EPROM chip, which is programmed by the "Vocal Conceptor" circuit from Lextronic. Although not shown in FIG. 1, protective circuits, which are well-known to those skilled in the art, such as diodes are currently implemented between remote control 150 and LCD 170 and audio circuit 160 so that LCD 170 and audio circuit 160 are not falsely triggered by the operation of remote control 150.

Figure 2:
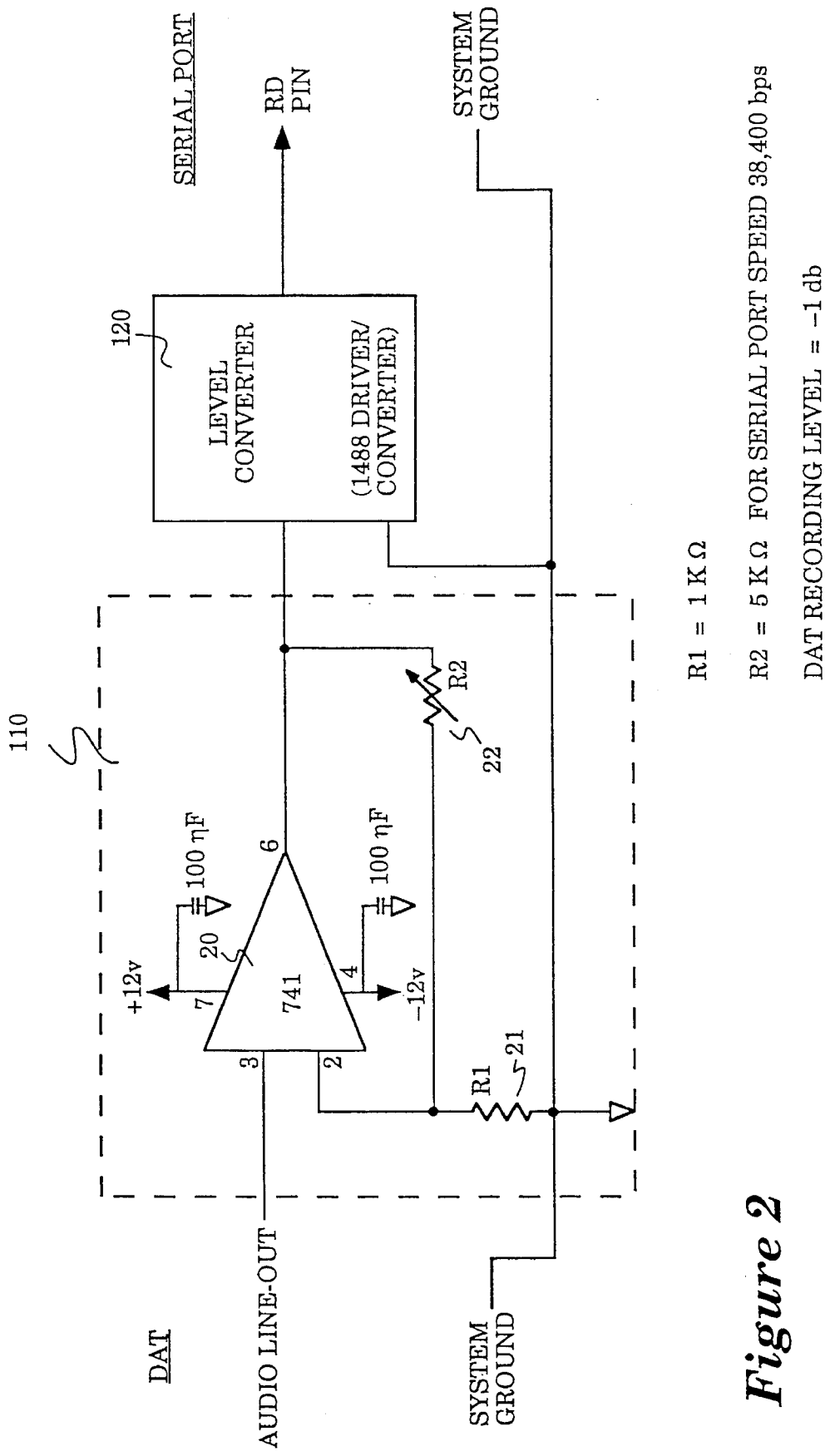
FIG. 2 is a circuit diagram for the amplifier circuit in the streamer apparatus in accordance with the teachings of the present invention.

Reference is now made to FIG. 2, where a circuit diagram for amplifier 110 is illustrated in further detail. Currently amplifier 110 is implemented in an LM741 operational amplifier 20 with gain resisters R1 21 and R2 22. This is a non-inverting amplifier circuit well-known to those skilled in the art. Currently R1 is set at 1 K$\Omega$, while R2 is set at 5 K$\Omega$ for serial port speed of 38,400 bps and recording level of −1 dB. For serial port speed of 9,600 bps, it has been found that R2 should be increased to about 10 $\Omega$ to achieve the desired result. However, R2 can be implemented in a potentiometer such that the gain of the LM741 operational amplifier can be trimmed in each individual application according to the speed of the serial port.

Level converter 120 for converting output from amplifier 110 is currently implemented in a Motorola MC1488 line driver before the level-converted data is transferred to the RD pin of the serial interface port. It should be apparent to those skilled in the art that other level converters are readily available for converting between RS-232-compatible levels and TTL-compatible levels.

Figure 3:
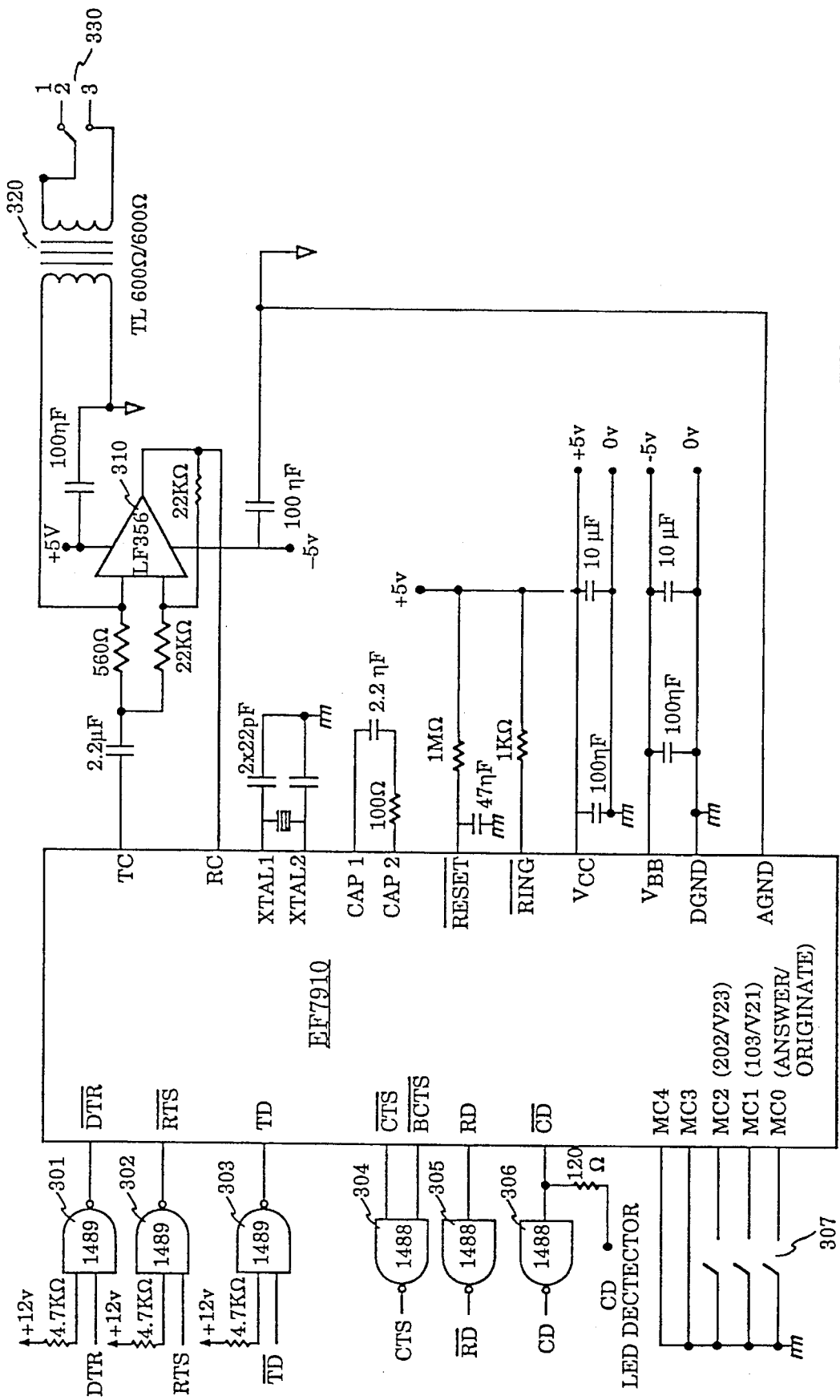
FIG. 3 illustrates a circuit diagram for the modem circuit incorporated in the streamer apparatus of the present invention.

It should be noted that modem 140 is currently implemented in a single-chip asynchronous voice-band modem EF7910, available from SGS-Thomson Microelectronics, to be compatible with both Bell and CCITT recommended standards. Five mode lines on the EF7910 chip select a desired modem configuration, whether it is 103/113/108, 202, V.21 or V.23 type modem configuration. FIG. 3 illustrates a circuit diagram for connecting the modem chip EF7910 300 to a telephone line 330 through an LF356 op-amp 310 working as a duplexor, as will be understood by those skilled in the art. Note that level converters 1489 and 1488 301–306 are currently connected to convert signals between RS-232C- and TTL-compatible signals. Switches MC0–MC2 307 are used for controlling either Bell or CCITT modem configuration. It should be noted that there are other equivalent single-chip modems, such as Am7910, available from Advanced Micro Devices, Santa Clara, Calif., capable of providing the intended functionality.

With reference again to FIG. 1, it should be appreciated by those skilled in the arts that streamer apparatus 10 of the present invention is best implemented with a universal power supply 145, or a rechargeable battery pack, capable of operating in any supply voltages such that it is operable in countries using either 110 volt or 220 volt. Currently a single, dual, triple and quad output power supply NFS110-7601P series from Computer Products is used, to provide the universal compatibility. However, it should be obvious to those skilled in the arts that other power supply arrangements are readily available to achieve the intended purpose.

I claim:

1. A streamer apparatus for transferring data between a first storage device of a computer system having serial interface transmit and receive ports for transmitting and receiving serial data, respectively, and a digital audio player/recorder having an audio line-in port and an audio line-out port, wherein said digital audio player/recorder utilizes a recording medium selected from a group consisting of digital audio tape and recordable compact disc, said streamer apparatus comprising:

data path means for transferring first data stored in said first storage device through said serial interface transmit port to said audio line-in port of said digital audio player/recorder, said digital audio player/recorder for storing a back-up copy of said first data, said digital audio player/recorder recording at a predetermined level;

amplifier means coupled to said audio line-out port of said digital audio player/recorder for receiving and amplifying second data from said digital audio player/recorder by a predetermined factor;

first level converter means coupled to said amplifier means and said serial interface receive port for level-converting said second data to be compatible with said serial interface receive port, said first level converter means transferring the level-converted second data to said first storage device through said serial interface receive port;

remote control means coupled to said digital audio player/recorder for controlling the operation of said digital audio player/recorder, said remote control means being preprogrammed to provide control of said digital audio player/recorder by a user;

programmable liquid-crystal display means coupled to said remote control means for providing a plurality of visual display signals indicative of the status of said digital audio player/recorder, said plurality of visual display signals being generated based on a plurality of preprogrammed status indicators;

audio signal generator coupled to said remote control means for providing a plurality of preprogrammed voice signals indicative of the status of said digital audio player/recorder.

2. A streamer apparatus according to claim 1, further comprising a universal power supply unit for supplying a range of voltages to be consumed by said streamer apparatus.

3. A streamer according to claim 1, wherein said digital audio player/recorder is a digital audio tape (DAT) player/recorder.

4. A streamer apparatus for transferring data between a first storage device of a computer system having serial interface transmit and receive ports for transmitting and receiving serial data, respectively, and a digital audio player/recorder having an audio line-in port and an audio line-out port, wherein said digital audio player/recorder utilizes a recording medium selected from a group consisting of digital audio tape and recordable compact disc, said streamer apparatus comprising:

data path means for transferring first data stored in said first storage device through said serial interface transmit port to said audio line-in port of said digital audio player/recorder, said digital audio player/recorder for storing a back-up copy of said first data, said digital audio player/recorder recording at a predetermined level, wherein said serial interface transmit and receive ports are implemented on one of an RS-232 interface and an RS-422 interface, said serial interface transmit and receive ports having transmit-data (TD) and receive-data (RD) pins, respectively, and said data path means connects the TD pin of said serial interface transmit port to said digital audio back-up storage device;

amplifier means coupled to said audio line-out port of said digital audio player/recorder for receiving and amplifying second data from said digital audio player/recorder by a predetermined factor;

first level converter means coupled to said amplifier means and said serial interface receive port for level-converting said second data to be compatible with said serial interface receive port, said first level converter means transferring the level-converted second data to said first storage device through said serial interface receive port;

remote control means coupled to said digital audio player/recorder for controlling the operation of said digital audio player/recorder, said remote control means being preprogrammed to provide control of said digital audio player/recorder by a user;

programmable liquid-crystal display means coupled to said remote control means for providing a plurality of visual display signals indicative of the status of said digital audio player/recorder, said plurality of visual display signals being generated based on a plurality of preprogrammed status indicators;

audio signal generator coupled to said remote control means for providing a plurality of preprogrammed voice signals indicative of the status of said digital audio player/recorder.

5. A streamer apparatus according to claim 4, wherein said amplifier means comprises an LM741 operational amplifier coupled to said digital audio player/recorder.

6. A streamer apparatus according to claim 4, wherein said first level converter means comprises Motorola MC1488 line driver and said second level converter means comprises Motorola MC1489 line receiver circuits.

7. A streamer apparatus according to claim 4, wherein said DAT player/recorder records at −1 dB.

8. A method of transferring data between a first storage device of a computer system having serial interface transmit and receive ports for transmitting and receiving serial data and one of a digital audio player/recorder having an audio line-in port and an audio line-out port and a remote data processing system, wherein said digital audio player/recorder comprises a digital audio player/recorder utilizing a recording medium selected from a group consisting of digital audio tape and recordable compact disc, said method comprising the steps of:

storing a back-up copy of first data into said digital audio player/recorder, comprising the steps of;
coupling said audio line-in port of said digital audio player/recorder to said serial interface transmit port for recording;
transferring first data stored in said first storage device through said serial interface transmit port to said audio line-in port of said digital audio player/recorder, said digital audio player/recorder recording at a predetermined level;

retrieving second data from said digital audio player/recorder, comprising the steps of;
coupling said audio line-out port of said digital audio player/recorder to said serial interface receive port;
amplifying said second data from said digital audio player/recorder by a predetermined factor;
level-converting said second data to be compatible with said serial interface receive port;
receiving the level-converted second data at said serial interface receive port;

transferring third data to said remote data processing system, comprising the steps of:
coupling said remote data processing system to said serial interface transmit port through a modem circuit;
level-converting said third data from said serial interface transmit port;
transferring the level-converted third data from said first storage device of said computer system to said remote data processing system, said modem circuit coupling to said remote data processing system through a telephone line;

retrieving fourth data from said remote data processing system, comprising the steps of:
coupling to said remote data processing system through a modem circuit to receive said fourth data through said telephone line;
level-converting said fourth data to be compatible with said serial interface receive port;
receiving the level-converted fourth data at said serial interface receive port.

9. A streamer apparatus for transferring data between a first storage device of a computer system having serial interface transmit and receive ports and one of a digital audio player/recorder having an audio line-in port and an audio line-out port and a remote data processing system, wherein said digital audio player/recorder utilizes a recording medium selected from a group consisting of digital audio tape and recordable compact disc, said streamer apparatus comprising:

data path for transferring first data stored in said first storage device through said serial interface transmit port to said audio line-in port of said digital audio player/recorder;

amplifier means coupled to said audio line-out port of said digital audio player/recorder for receiving and amplifying second data from said digital audio player/recorder;

first level converter means coupled to said amplifier means and said serial interface receive port for level-converting said second data to be compatible with said serial interface receive port, said first level converter means transferring the level-converted second data to said first storage device through said serial interface receive port;

second level converter means coupled to said serial interface transmit port for level-converting said first data from said serial interface transmit port;

remote communication means coupled to said second level converter means for transferring the level-converted first data from said serial interface transmit port to said remote data processing system through a telephone line;

third level converter means coupled to said remote communication means for level-converting third data from said remote computer system and transferring said third data to said serial interface receive port;

remote control means coupled to said digital audio player/recorder for controlling the operation of said digital audio player/recorder by a user; and switching means coupled to said digital audio player/recorder and said remote control means, said switching means activating one of said remote communication means and said digital audio player/recorder.

10. A streamer apparatus for transferring data between a first storage device of a computer system having serial interface transmit and receive ports for transmitting and receiving serial data, respectively, and a digital audio player/recorder having an audio line-in port and an audio line-out port, wherein said digital audio player/recorder utilizes a recording medium selected from a group consisting of digital audio tape and recordable compact disc, said streamer apparatus comprising:

data path means for transferring first data stored in said first storage device through said serial interface transmit port to said audio line-in port of said digital audio player/recorder, said digital audio player/recorder for storing a back-up copy of said first data, said digital audio player/recorder recording at a predetermined level;

amplifier means coupled to said audio line-out port of said digital audio player/recorder for receiving and amplifying second data from said digital audio player/recorder by a predetermined factor;

first level converter means coupled to said amplifier means and said serial interface receive port for level-converting said second data to be compatible with said serial interface receive port, said first level converter means transferring the level-converted second data to said first storage device through said serial interface receive port;

second level converter means coupled to said data path for level-converting said first data from said serial interface transmit port;

remote communication means coupled to said second level converter means for transferring the level-converted first data from said first storage device of said computer system to at least one remote computer system through a telephone line;

third level converter means coupled to said remote communication means for level-converting third data from said remote computer system and transferring said third data to said serial interface receive port.

11. A streamer apparatus according to claim 10, further comprising:

remote control means coupled to said digital audio player/recorder for controlling the operation of said digital audio player/recorder, said remote control means being preprogrammed to provide control of said digital audio player/recorder to a user.

12. A streamer apparatus according to claim 11, further comprising a switching means coupled to said remote communication means and said remote control means, said switching means activating one of said remote communication means and said digital audio player/recorder.

13. A streamer apparatus according to claim 10, wherein said remote communication means comprises a modem circuit for transferring the level-converted first data from said first storage device of said computer system to at least one remote computer system through a telephone line.

14. A streamer apparatus according to claim 13, wherein said remote communication means further comprises a facsimile means for transferring the level-converted first data from said first storage device of said computer system to at least one remote facsimile system through a telephone line.

* * * * *